United States Patent
Piasecki

(10) Patent No.: US 10,831,192 B1
(45) Date of Patent: Nov. 10, 2020

(54) CONTROL SYSTEM FOR AN AIRCRAFT

(71) Applicant: Piasecki Aircraft Corporation, Essington, PA (US)

(72) Inventor: John W. Piasecki, Bryn Mawr, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 0 days.

(21) Appl. No.: 15/709,289

(22) Filed: Sep. 19, 2017

Related U.S. Application Data

(60) Provisional application No. 62/397,254, filed on Sep. 20, 2016.

(51) Int. Cl.
| | | |
|---|---|---|
| G05D 1/00 | (2006.01) | |
| G08G 5/00 | (2006.01) | |
| G05D 1/06 | (2006.01) | |
| G05D 1/10 | (2006.01) | |

(52) U.S. Cl.
CPC .......... G05D 1/0077 (2013.01); G05D 1/0088 (2013.01); G05D 1/0676 (2013.01); G05D 1/101 (2013.01); G08G 5/0086 (2013.01)

(58) Field of Classification Search
CPC .. G05D 1/0077; G05D 1/0088; G05D 1/0676; G05D 1/101; G08G 5/0086
See application file for complete search history.

(56) References Cited

U.S. PATENT DOCUMENTS

| | | | |
|---|---|---|---|
| 7,438,259 B1 | 10/2008 | Piasecki et al. | |
| 8,682,521 B2 * | 3/2014 | Mach | G05D 1/0011 701/23 |
| 2004/0068372 A1 * | 4/2004 | Ybarra | G05D 1/0607 701/301 |
| 2005/0051666 A1 * | 3/2005 | Lee | B64C 30/00 244/10 |
| 2009/0292407 A1 * | 11/2009 | Minelli | B64C 27/26 701/3 |
| 2011/0118907 A1 * | 5/2011 | Elkins | B64B 1/00 701/3 |
| 2013/0206899 A1 * | 8/2013 | Sahasrabudhe | G05D 1/0858 244/17.13 |
| 2014/0142785 A1 * | 5/2014 | Fuentes | G05D 1/0011 701/2 |
| 2017/0323129 A1 * | 11/2017 | Davidson | G11B 7/08 |

* cited by examiner

*Primary Examiner* — Behrang Badii
*Assistant Examiner* — Daniel L Greene
(74) *Attorney, Agent, or Firm* — Robert J. Yarbrough; Lipton, Weinberger & Husick

(57) ABSTRACT

An automated control system for an aircraft having redundant control effectors is configured to select among multiple combinations of redundant control effector settings to achieve a selected flight condition. The control system is configured to optimize the selected control effector settings for the selected flight condition and is configured to accommodate damage or system failure.

6 Claims, 12 Drawing Sheets

CONTROL SYSTEM FOR AN AIRCRAFT

I. RELATED APPLICATION

This application is entitled to priority from U.S. Provisional Patent Application 62/397,254 filed Sep. 20, 2016, which is incorporated by reference as if set forth in full herein.

II. BACKGROUND OF THE INVENTION

A. Field of the Invention

A control system controls an aircraft to accomplish a mission. The aircraft may be a modular and morphable air vehicle capable of autonomous flight, but may be any aircraft. The control system may be configured to select a flight path. For air vehicles that have redundant control effectors, the control system may be configured to select among multiple combinations of redundant control effector settings to achieve a selected flight condition along the selected flight path. The control system may be configured to optimize the selected control effector settings for the selected flight condition and may be configured to accommodate damage, system failure, or adverse changes to the vehicle center of gravity.

As used in this document, the term 'flight condition' means the attitude, altitude and accelerations of an aircraft at a moment in time, and may include any or all of the position, air speed, direction of travel, relative wind, and angular velocities and accelerations in pitch, roll and yaw. The 'flight condition' of an aircraft means the condition of aircraft when the aircraft is in a trimmed condition and also means the condition of the aircraft when the aircraft is not in a trimmed condition.

B. Description of the Related Art

U.S. Provisional Patent Application 61/345,535, filed May 17, 2010 by John W. Piasecki and others and U.S. Provisional Patent Application No. 61/416,965 filed Nov. 24, 2010 by John W. Piasecki and others are hereby incorporated by reference in this document as if set forth in full herein. U.S. utility patent application Ser. No. 13/068,601 filed May 16, 2011 by John W. Piasecki and others and U.S. Pat. No. 9,045,226 to the same inventors issued Jun. 2, 2015 are incorporated by reference in this document as if set forth in full herein. U.S. Pat. No. 9,393,847 issued Jul. 19, 2016 and U.S. Pat. No. 9,610,817 issued Apr. 4, 2017 are hereby incorporated by reference as if set forth in full herein. Non-provisional application Ser. No. 15/709,075, non-provisional application Ser. No. 15/709,170 and non-provisional application Ser. No. 15/709,235, all filed Sep. 19, 2017, are hereby incorporated by reference as if set forth in full herein.

The documents incorporated by reference disclose a modular and morphable air vehicle. The modular and morphable air vehicle includes an unmanned flight module, referred to as an 'air module' in the documents incorporated by reference. The flight module is configured to selectably support a mission module in flight. The mission module is referred to as a 'ground module' in the documents incorporated by reference. One of the embodiments of the modular and morphable air vehicle has two ducted fans configured to support the flight module in flight. The flight module and mission module combination or the flight module alone may fly as a rotary wing aircraft in a side-by-side configuration and also may fly as a fixed wing aircraft in a tilted-rotor configuration. In the tilted-rotor configuration the two ducted fans tilt about an axis perpendicular to the thrust line of the ducted fans. The flight module may move between the side-by-side and tilted-rotor configurations 'in stride;' that is, during flight. The tilted-rotor configuration is suitable for high-speed flight. The side-by-side configuration is suitable for low-speed and hovering flight. The flight module may have other configurations as disclosed in the in documents incorporated by reference. The documents incorporated by reference also disclose redundant control effectors for the flight module.

The mission module may be a wheeled passenger vehicle and may be driven on the ground under its own power either with or without the flight module attached. The mission module may be a medical module, a cargo module, a weapons module, a passenger module, a communications module, or any other mission module disclosed by the documents incorporated by reference. The flight module can fly either with or without the mission module engaged and can support the mission module in flight.

For a flight module having two ducted fans that may be oriented in a side-by-side and in a tilted-rotor configuration, the flight module includes control effectors. In one embodiment, those effectors include collective pitch, monocyclic pitch and differential duct tilt of the rotors of both ducted fans, combined with twisting of the ducted fans in relation to the central unit of the flight module.

In the side-by-side configuration, monocyclic pitch combined with differential tilt of the two ducted fans provides yaw control. Providing monocyclic pitch that is the same for both of the ducted fans will apply a pitching moment to the flight module. Providing differential collective pitch, power and rotational speed that are different for one ducted fan than the other will provide a rolling moment to the flight module.

In the tilted-rotor configuration, providing differential monocyclic pitch for the ducted fans applies a rolling moment to the flight module. Providing monocyclic that is the same for both of the ducted fans also will apply a pitching moment to the flight module. Providing collective pitch, power and rotational speed that is different for one ducted fan than the other will provide a yawing moment to the flight module.

The flight module may include redundant control effectors. Those redundant control effectors may include morphable ducts for the ducted fans that may include morphable leading edge portions, air dams at the leading edge portions of the ducts, duct trailing edge control surfaces, and vanes in the ducted fan exhaust. The morphable leading edge portions, air dams, trailing edge control surfaces and vanes may be differentially controllable between the two ducts and may be asymmetrically controllable around the perimeter of each duct.

The flight module may also include redundant control surfaces incorporated into landing gear for the flight module. The control surfaces incorporated into the landing gear may provide redundant pitch, roll and yaw control, particularly when the flight module is flying at relatively high speed in the tilted-rotor configuration.

The flight module may include active center of gravity ('CG') control by moving a mission module or other mass with respect to a flight module supporting the mission module. The mission module may be moved in the fore and aft direction to control pitch and roll of the vehicle in any mode of flight, including the side-by-side configuration and the tilted-duct configuration.

The flight module may include supplementary fans in addition to the two ducted fans to provide additional and redundant control authority, particularly for pitch control. The supplementary pitch control fans may be attached to a horizontal stabilizer in a spaced-apart relation to the ducted fans. Supplementary fans also may be mounted to wing extensions to provide lateral translation or yaw authority when the ducts are in the side-by-side condition and the wings extensions are folded.

III. BRIEF DESCRIPTION OF THE INVENTION

The control system of the invention is configured to monitor and to control each of the control effectors of an aircraft to accomplish a mission. The control effectors may be redundant and the control system may be autonomous. The control system may be configured to select a flight path and may be configured to select among multiple combinations of redundant control effector settings to achieve a selected flight condition along the selected flight path. The control system may be configured to optimize the selected control effector settings for the selected flight condition and may be configured to accommodate damage or system failure. The aircraft may be a flight module of a modular and morphable air vehicle.

A. Information Available to the Control System

Sensors inform the control system and may detect environmental conditions and the condition of the flight module. The flight module may include terrain and obstacle detection sensors and may be aware of expected terrain or other geographic conditions through terrain models or other geographic information loaded into control system memory or through geographic information supplied to the control system from an external source, such as an external controller or communications network. The control system also may be informed of anthropogenic features such as no-go zones in which flight is hazardous due to incoming or outgoing fire or due to human-caused obstructions such as buildings or communications towers. The control system may be informed of the degree of hazard of a zone, with some dangerous geographic areas being assigned a lower hazard ranking than other dangerous geographic areas. The control system may be informed of other resources, such as the locations of service areas, medical facilities and known safe landing zones. The control system also may be informed of weather information relevant to a mission.

B. Mission Assignment

The control system may operate the flight module autonomously to accomplish a mission. The control system receives a mission assignment from a controller. The controller may be a remote operator or may be a passenger of a mission module attached to the flight module where the passenger exercises supervisory control over the control system. A typical mission assignment would be to deliver or retrieve a mission module to or from a specified location. Each mission has associated mission criteria; namely: priority, urgency, risk tolerance and cost tolerance. The priority, urgency, risk tolerance and cost tolerance may be assigned in whole or in part by the controller, or may be assigned by the control system based on the nature of the mission. The 'priority' criterion determines the order in which the flight module will undertake multiple assigned missions in a missions queue. The 'urgency' criterion determines how the control system will weigh the need for speed in accomplishing the mission. The 'risk tolerance' criterion determines the level of hazard that the control system will risk to accomplish the mission. The 'cost tolerance' criterion determines the weight that the control system will assign to minimizing the costs of accomplishing the mission. The 'cost tolerance' may be divided into long-term costs, such as life cycle costs, and short-term costs, such as fuel or other consumable resource consumption. The control system considers each of the above factors in selecting a flight path to accomplish a mission and in selecting each setting of each control effector to follow that flight path.

C. Flight Path Selection

If the flight module is assigned a flight path by a controller, then the control system follows the assigned flight path. If the control system selects a flight path, then the control system evaluates a plurality of flight paths each of which will allow the flight module to complete the mission. The control system selects a flight path to achieve the mission consistent with the priority, urgency, risk tolerance and cost tolerance of the mission.

Where the flight module has been assigned multiple missions, the control system will consider the priority of each mission in determining the sequence in which to accomplish the missions. The control system may consider the queue of missions as a whole and may consider a single flight path to accomplish all of the missions in sequence, consistent with the priorities assigned to the missions.

For each of the plurality of possible flight paths being evaluated, the control system will determine an urgency value for the flight path. The urgency value reflects how quickly the flight module will complete each mission compared to alternative flight paths. Where a mission is very urgent, for example, evacuating a critically injured soldier from a battlefield, the urgency and hence time to complete the mission may dominate other factors.

The control system also will determine the hazard presented by each flight path. In determining the hazard, the control system will include the physical risk to the flight module and to any attached mission module presented by geographic or anthropogenic features; for example, hazards presented by mountains, trees, towers or buildings. The control system will also consider the hazard presented to the flight module by hostile action during travel along the flight path being evaluated, such as whether the flight path takes the flight module over an area under hostile control, the degree of hazard presented by that area and the duration of the flight that will be through the area under hostile control. If the calculated hazard of a flight path exceeds the hazard tolerance of the mission, then the flight path is rejected. For remaining flight paths, the hazard of each flight path is considered in the flight path selection.

In selecting a flight path for the flight module, the control system also will consider the cost tolerance. The control system will determine a relative cost for each of the evaluated flight paths. The relative cost may include both the short-term cost, such as the consumption of fuel and materials, and the long-term cost, such as the life cycle cost of the flight module. In some circumstances, the short-term costs may dominate, as when a limited supply of fuel is available in an area of operation, allowing only a limited number of missions or only missions at low speed or of short duration.

The control system may apply the mission criteria of priority, urgency, hazard tolerance and cost tolerance as weighting factors and may rank evaluated flight paths based on those weighting factors. The control system may select the most suitable evaluated flight path based on the weighting factors. The control system then may evaluate other flight paths that have characteristics similar to the previously top-ranked flight paths to determine whether the control system can identify flight paths that are superior to the previously top-ranked flight paths. The control system may evaluate alternative flight paths continuously during the mission based on the information available to the control system at the time and may select and follow a new, better flight path at any time, including during the mission.

D. Selection of Control Effector Settings

The redundant control effectors available to the control system provide an infinite number of options among which the control system may choose to achieve a commanded flight condition and to accomplish a mission. For example, when the flight module is flying in the tilted-rotor configuration, the control system may apply the following control effectors of an appropriately-equipped flight module to control pitch, as discussed in the documents incorporated by reference:

1. landing gear control surface settings,
2. the position of the landing gear,
3. monocyclic pitch settings for both of the ducted fans,
4. asymmetric morphing duct settings for the leading edge of the ducts,
5. asymmetric air dam setting for the ducts,
6. duct trailing edge control surface settings,
7. active center of gravity control,
8. engine exhaust vectoring, and
9. ducted fan exhaust vane vectoring.
10. supplementary fan thrust The control system may select any combination of settings of the above control effectors or any other available redundant effectors to accomplish a selected flight condition. The different combinations of control effectors settings will achieve different results in terms of speed, stability, vibration, fuel consumption, noise and life-cycle costs. The control system, informed by sensors, may optimize the effector settings to achieve the desired flight condition consistent with the mission criteria of the flight module. For example, if the flight module is flying to an injured soldier on a battlefield, the urgency criterion may dominate and the control system may discount life cycle costs to achieve maximum speed. On the return trip, with the injured soldier as a passenger, the control system may select effector settings to reduce vibration and may select a different flight path to reflect a reduced hazard tolerance.

The control system may constantly monitor the flight condition and operating parameters of the flight module and constantly determine whether any condition of the flight module may prevent the completion of the mission. For example, if the control system detects that the flight module does not have adequate fuel to fly at the selected high speed for the duration of the mission, the control system may select a combination of control effector setting that result in lower speed and reduced fuel consumption.

The control system may constantly adjust the redundant control effector settings to best achieve the selected flight condition. For example, the control system of the flight module in trimmed flight may be constantly informed of the rate of fuel consumption, vibration, airspeed and temperature of key components. The control system may simultaneously change redundant control effector settings while maintaining the desired trimmed flight condition. If the control system observes that the performance of the aircraft improves with the new control effector settings, the control system will retain the new control effector settings and discard the old settings. For example, if increased speed and reduced fuel consumption are criteria for a particular mission and if the control system observes that after a change in control settings that airspeed increases and fuel consumption decreases, the control system will consider the control settings as improved. As a second example, if reduced vibration is a criterion for a particular mission and if the control system observes that after a change in control settings that vibration is reduced, the control system will consider the control settings as improved. The control system also may be a learning system; namely, when the control system requires control effector settings under similar conditions, the control system will remember the previously superior effector settings and will select those effector settings as a starting point.

As the control systems tries different combinations of control effector settings, performance of the aircraft consistent with the mission criteria and the commanded flight condition will improve and the performance difference between the sets of control effector settings will reduce. Once the control system determines that it has achieved the optimum combination of flight control settings to maintain the selected flight condition and to accomplish the mission consistent with the criteria for the particular mission, the control system will maintain those control settings until the situation changes, either through a changed command or a change in flight condition.

Alternatively, the control system may never conclude that it has reached an optimal control state. As the control system tries alternative combinations of control settings, the difference between the alternative control states narrows as the combinations of settings improves. The smaller the difference in control states, the slower the rate at which the control system tries alternative combinations of control settings. As the combination of control settings approaches, but does not reach, an optimum combination, the control system will slowly cycle between closely related combinations of control settings. If any combination shows an improvement in performance, the control system will retain the new combination of settings and discard the old combination. If the control system determines that the difference in performance of different combinations of control settings is increasing, the control system will try combinations of control settings having a larger difference and will increase the rate at which it tries alternative combinations of control settings.

E. Damage Tolerance

The control system constantly monitors the flight condition of the flight module. The control system may monitor the altitude, air temperature, attitude, relative wind, velocities and accelerations of the flight module, such as the angular position, angular velocity and angular accelerations in pitch, roll and yaw. The expected flight condition of the flight module may be perturbed, as by atmospheric conditions, by a shift in the load of the flight module, by an impact to the flight module, by a failure of a flight module system, or for any other reason. The control system will attempt to correct for the perturbation and return to the original flight condition by sending commands to appropriate control effectors. If the control system as informed by the sensors determines that a selected combination of control effector settings does not correct a perturbation or is incapable of maintaining a commanded flight condition, for example due to a degradation of a redundant control effector, the control system will select a different combination of settings consistent with the detected and inferred performance of each of the control effectors.

In other words, the control system is constantly engaged in energy management and state management of the aircraft. Energy management is the awareness of the control system of the available energy and hence remaining capabilities of the aircraft. The energy available to the aircraft and hence to the control system may be defined by the fuel remaining on board and by the altitude, air temperature, and speed of the aircraft, and may be constrained by the aircraft state, such as the flight condition of the aircraft, by weather conditions, or by a degraded system, such as a damaged or missing control effector, by an overheated bearing, by a leaking hydraulic system, by an unbalanced load, or by any other condition that limits aircraft performance, range, or options available to the control system. The control system will consider the energy available to the aircraft and the state of the aircraft in selecting among its options for a commanded flight condition.

If the control system determines that the air vehicle it is not able to achieve the commanded flight condition, for example as a result of system failure or damage to the flight module, the control system may select an alternative flight condition consistent with energy management and consistent with the completion of the mission of the flight module. For example, if the control system determines that the flight module is not able to maintain high-speed flight due to excess fuel consumption caused by a partially deployed control effector, the control system may select a lower-speed flight condition that the flight module can maintain, or may select a shorter flight path that presents a greater hazard.

If the control system projects that the flight module will not be able to complete its mission, for example, due to a progressive failure of a control effector, such as by an overheating bearing or by progressive loss of hydraulic fluid, the control system may inform the controller of the issue and divert the flight module to a suitable landing location within the remaining capability of the flight module, such as a service area for repair.

If the control system projects that the flight module will not be able to maintain flight long enough to either complete the mission or to reach suitable landing location, the control system will land the flight module in a controlled manner at a best achievable landing location. The control system will utilize terrain sensors such as radar, optical sensors or lidar to identify a landing location that is adequately free of obstructions and that is adequately level for a controlled landing. If the control system is not able to identify such an area, then the control system will make a controlled landing at the best location achievable based on the remaining capabilities of the flight module.

If the control system determines that the flight module is not able to maintain controlled flight to achieve a controlled landing, for example, due to a catastrophic failure of a ducted fan during hover in the side-by-side configuration, the control system will implement emergency self-rescue measures. Those emergency rescue measures may include one or more ballistic parachutes and air bags and may include any of the other rescue measures described in the documents incorporated by reference and any other rescue options available to the control system.

IV. BRIEF DESCRIPTION OF THE DRAWINGS

V. DESCRIPTION OF AN EMBODIMENT

A. The Modular and Morphable Air Vehicle

Figure 1:
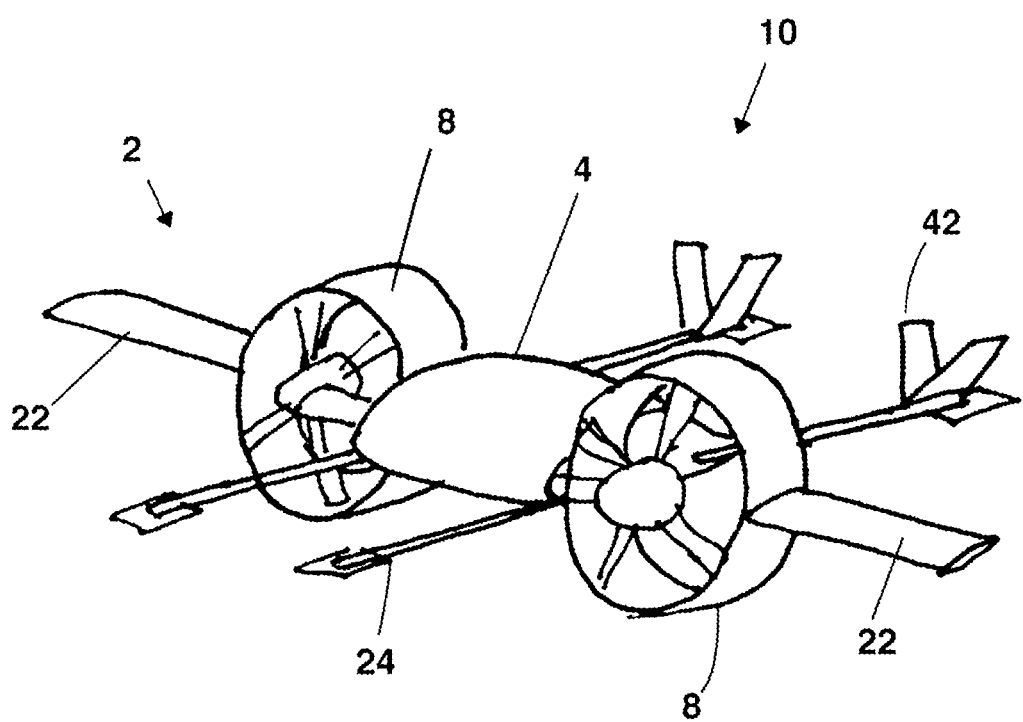
FIG. 1 is a perspective view of the flight module in the tilted-duct configuration.
Figure 2:
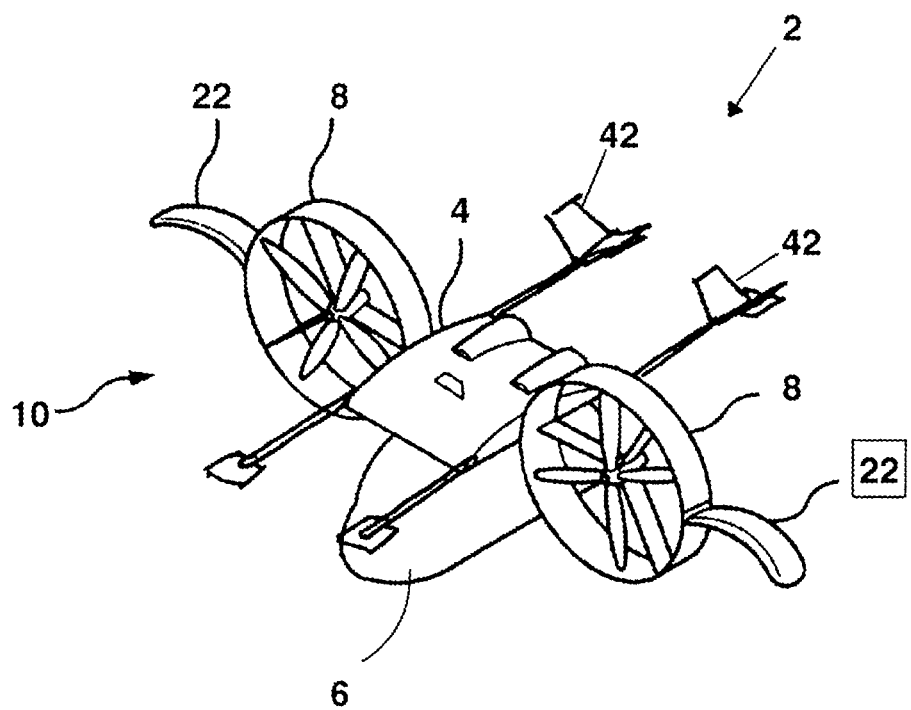
FIG. 2 is a perspective view of the flight module with a mission module attached.
Figure 3:
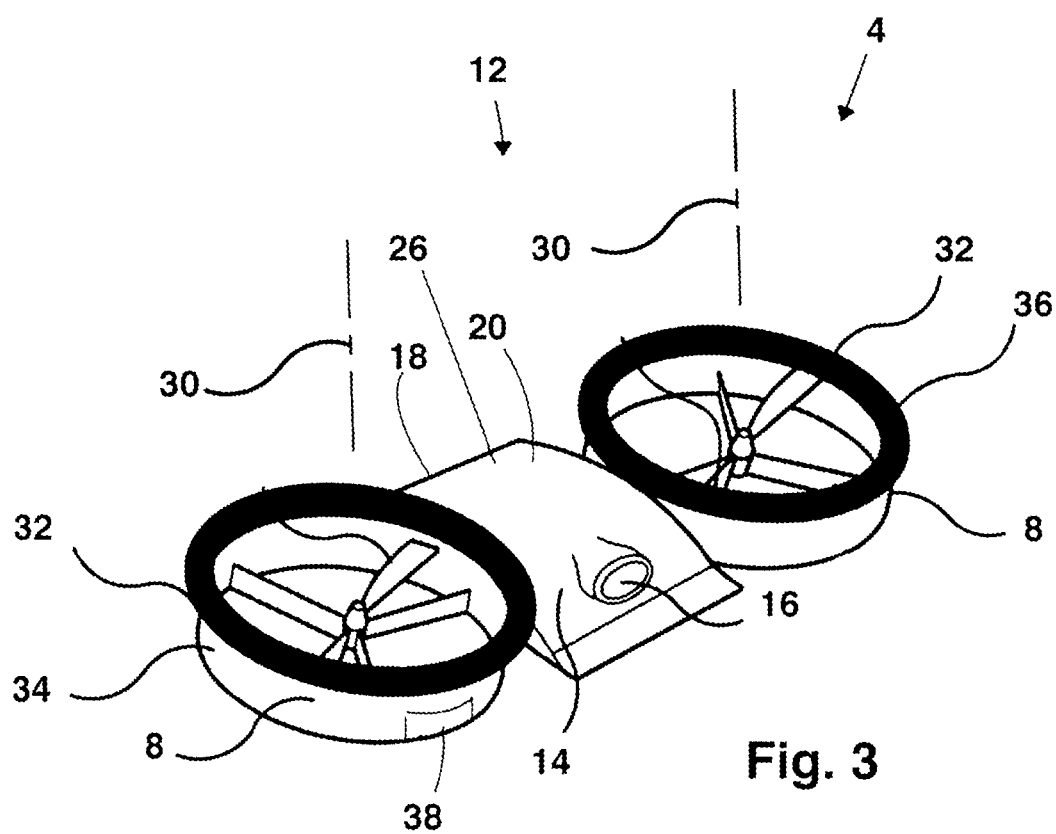
FIG. 3 is a perspective view of the flight module in the side-by-side configuration.

FIGS. 1 through 3 illustrate the personal air vehicle 2 as described in the documents incorporated by reference. The personal air vehicle 2 includes a flight module 4 that is configured to be selectably attached to a mission module 6, as shown by FIG. 2. The flight module 4 is unmanned and includes two ducted fans 8. The two ducted fans 8 are configured to support the flight module 4 in flight both when the mission module 6 is not attached, shown by FIG. 1, and when the mission module 6 is attached, shown by FIG. 2. The flight module 4 can fly either with or without the mission module 6 attached and can support the mission module 6 in flight.

As noted above, the mission module 6 may be a wheeled passenger vehicle and may be driven on the ground under its own power either with or without the flight module 4 attached. The mission module 6 may be a medical module, a cargo module, a weapons module, a passenger module, a communications module, or any other mission module 6 disclosed by the documents incorporated by reference.

The personal air vehicle 2 is morphable between a tilted-rotor configuration 10, shown by FIGS. 1 and 2, and a side-by-side configuration 12 shown by FIG. 3. The flight module 4 includes a central unit 14 that houses the engines 16, drive system 18, avionics 20 and control system 26. The flight module 4 may include wing extensions 22 and landing gear 24. The personal air vehicle 2 may have any of the configurations or features described in the documents incorporated by reference.

B. Control System

Figure 4:
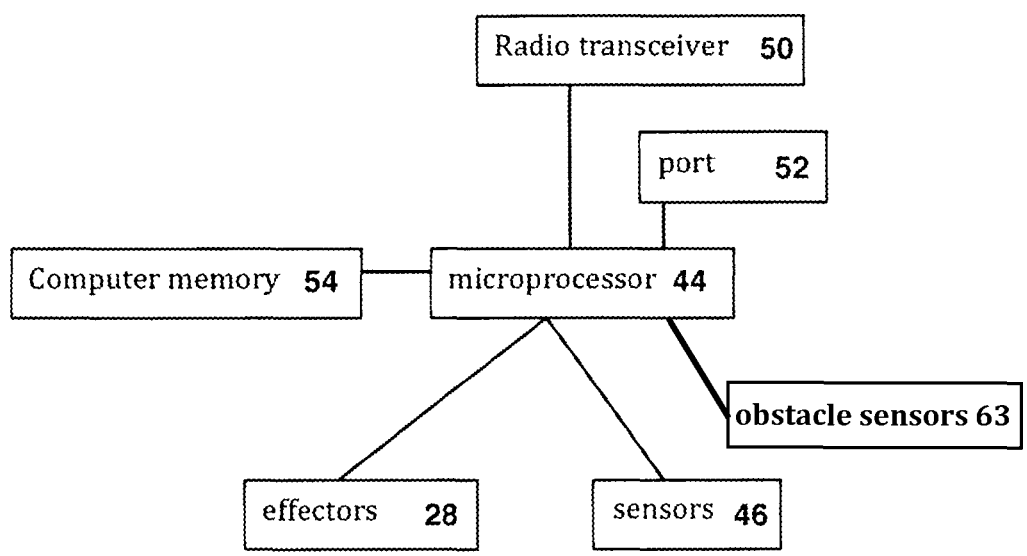
FIG. 4 is a block diagram of the control system hardware.

FIG. 4 is a block diagram of the elements of the control system 26. The control system 26 includes a microprocessor 44. The microprocessor 44 is configured to receive and to transmit information through the radio transceiver 50. A port 52 allows a controller to load information to or from the control system 26 by other than the radio 50. The microprocessor 44 can store information in computer memory 54 and can access that information. The microprocessor 44 is informed as to the condition of the flight module 4 by condition sensors 46 and as to the relative location of terrain and obstacles by terrain and obstacle sensors 63. The microprocessor controls control effectors 28 and can move each control effector 28 to a control effector position selected by the microprocessor 44. The microprocessor 44 may move the control effectors 28 by any conventional means known in the aeronautical arts, including hydraulic, electrical or mechanical actuators.

C. Redundant Control Effectors

Figure 5:
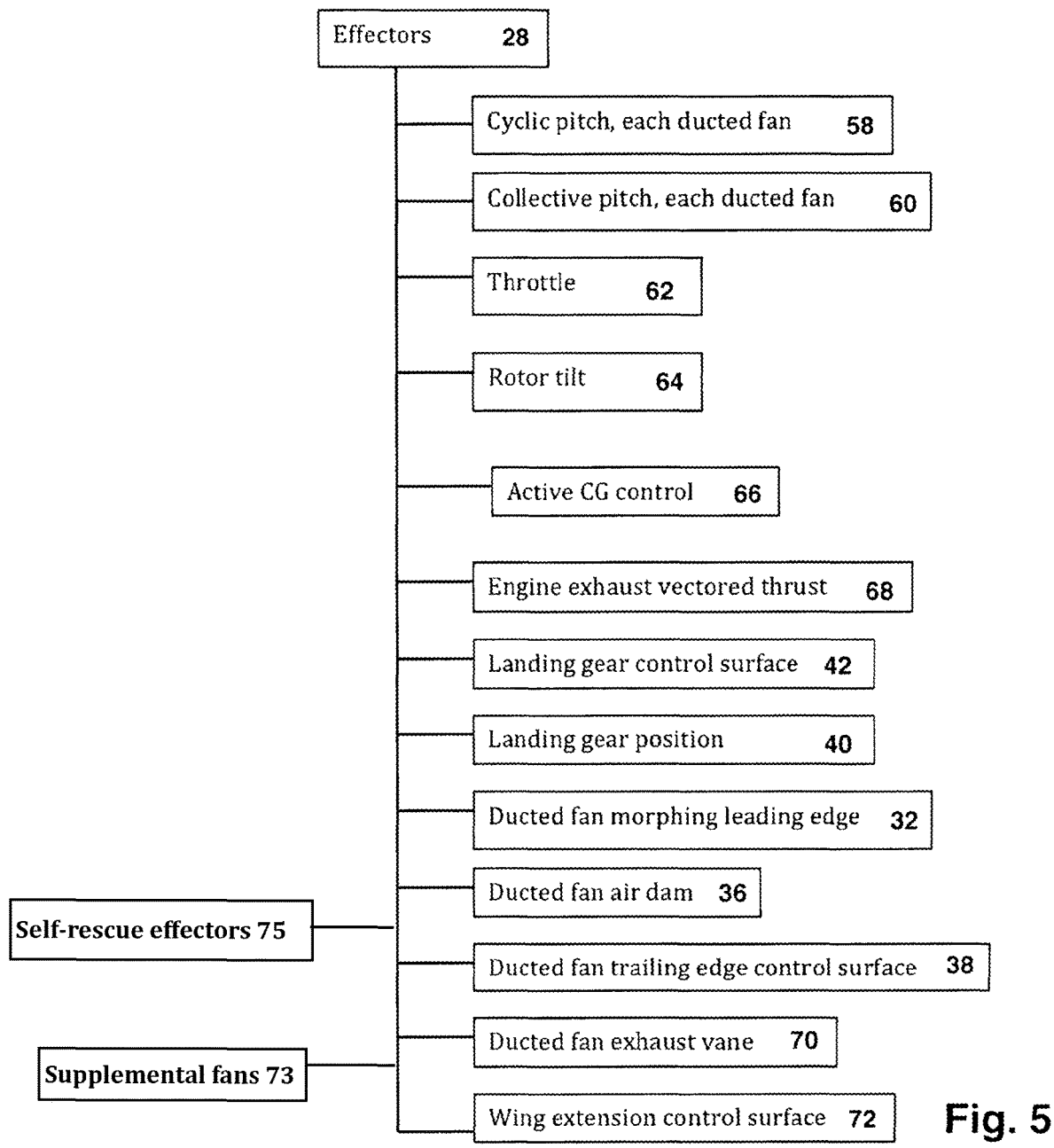
FIG. 5 is a block diagram of the control effectors available to the control system.

As shown by FIG. 5, the flight module 4 includes redundant control effectors 28 under the control of the control system 26. The redundant control effectors 28 may include some or all of the following, and may include any other control effector 28 taught by the documents incorporated by reference or any other redundant control effectors:

a. cyclic pitch 58 of the blades of each of the ducted fans 8, which may be monocyclic pitch;

b. collective pitch 60 of the blades of each of the ducted fans 8;

c. throttle positions 62 for the engine(s) 16;
d. exhaust vane position 70 for each of the ducted fans 8;
e. tilt 64 of the axis of rotation 30 of each of the ducted fans 8, which may be differential and may be combined with torsional mounting of the ducted fans 8;
f. active center of gravity ('CG') control 66;
g. engines 16 exhaust vectored thrust 68;
h. differentially and asymmetrically morphable leading edge portions 32 of the duct 34 for each ducted fan 8;
i. differentially and asymmetrically deployable air dams 36 on the leading edge portions 32 of the duct 34 for each ducted fan 8;
j. differentially and asymmetrically deployable trailing edge control surfaces 38 for the duct 32 of each ducted fan 8;
k. differential and asymmetric hinged landing gear 40 angle of deployment, where the landing gear 40 acts as one or more control surfaces;
l. landing gear control surfaces 42 attached to the landing gear 40 and that are separately controllable independent of the landing gear 40 angle of deployment;
m. wing extensions 22 attached to the ducted fans 8 and may include control surfaces 72, such as ailerons or flaperons.
n. supplement fans 73 attached to a horizontal stabilizer or wing extensions for pitch, lateral translation or yaw.

The flight module 4 also may include emergency self-rescue control effector 75 for rescue of the flight module, such as ballistic parachutes, airbags, or any of the other self-rescue apparatus taught by the documents incorporated by reference.

Each of the control effectors 28 has a plurality of control settings, each of which may apply a control moment or force to the flight module 4. Many of the control forces or moments available to the control system 26 are redundant to the forces or moments applied by other control effectors 28. The result is that the control system 26 has many options to achieve any given flight condition 48 and may select among a multiplicity of combinations of control effector settings for the redundant control effectors 28, where each of the combinations of control effector settings will achieve the selected flight condition 48.

For example, when the flight module 4 is flying in the tilted-rotor configuration 10 shown by FIGS. 1 and 2, the control system 26 may control pitch by applying a combination of any or all of the following control effectors 28: cyclic pitch 58 of the blades of the two ducted fans 8; exhaust vane position 70 of the two ducted fans 8; engine 16 exhaust thrust vectoring 68; active CG control 66; asymmetric morphing of the leading edge portion 32 of the ducts 34; asymmetric deployment of air dams 36 on the leading edge portions 32 of the ducts 34; deployment of duct trailing edge control surfaces 38; landing gear control surfaces 42; and symmetrical angle of deployment of the landing gear 40. Each of the possible combinations of control effector 28 settings will have different characteristics, such as control authority, power requirements and fuel consumption, drag, vibration, speed and stability. To achieve a selected flight condition 48, the control system 26 will select a combination of control effector 28 settings from among the multiplicity of possible combinations of control effector 28 settings that will achieve the flight condition 48 consistent with the mission criteria of a particular mission. The control system 26 will monitor the flight condition 48 of the flight module 4 as detected by sensors 46 using the selected combination of control effector settings. If the control system 26 determines that the selected combination is not achieving the selected flight condition 48, or is not consistent with the mission criteria, then the control system 26 will select a different combination of control effector settings that the control system 26 projects is better able to achieve both the selected flight condition 48 and the mission criteria.

D. Sensors

Figure 6:
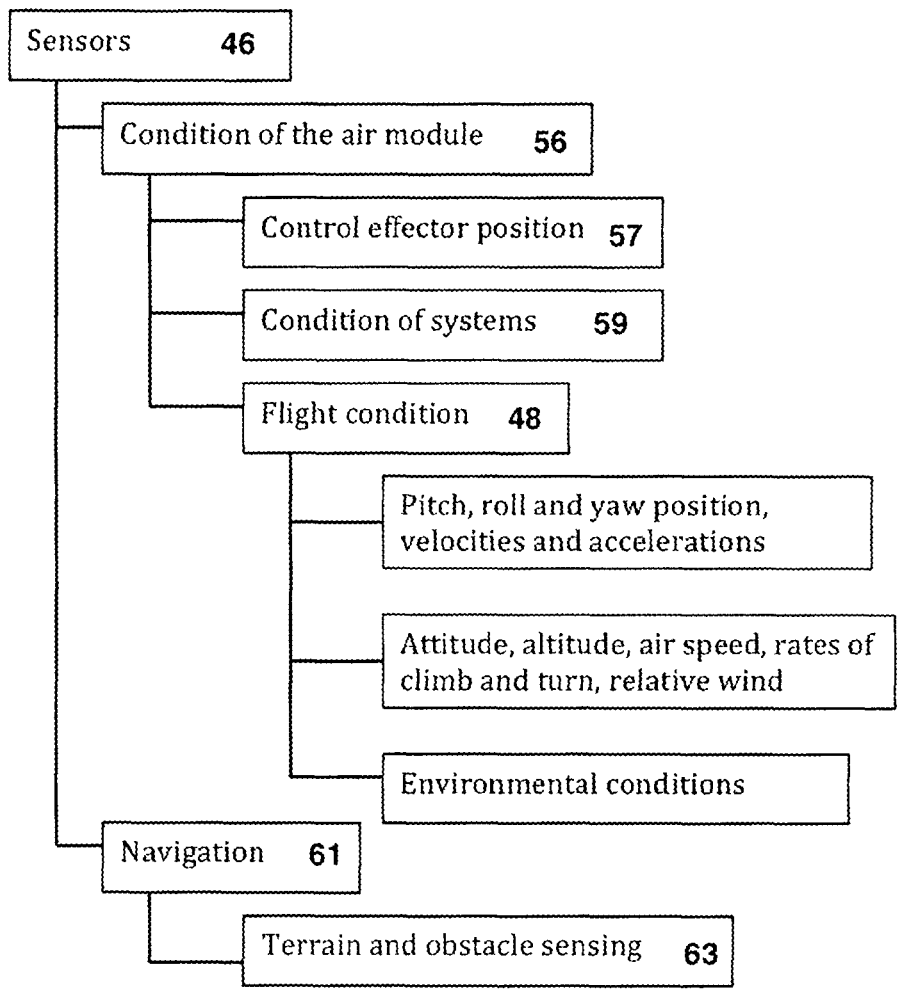
FIG. 6 is a block diagram of the sensors available to the control system.

FIG. 6 illustrates the sensors 46 under the control of the microprocessor 44 to detect and inform the microprocessor 44 of the condition 56 of the flight module 4 and the flight condition 48 of the flight module. The condition 56, or state, of the flight module 4 relates to the health of the flight module 4 and includes control effector position sensors 57 and flight module systems sensors 59, which detect the condition of flight module 4 systems, such as the engines 16, ducted fans 8 and control system 26. The condition 56 of flight module 4 systems includes matters such as fuel consumption rate and fuel remaining, engine 16 temperature and speed, temperature or vibration of engine 16 or ducted fan 8 bearings, hydraulic system pressure and any other condition of the flight module 4 or its components that can be measured by a conventional sensor 46 and communicated to the control system 26 microprocessor 44. The 'flight condition 48' of the flight module 4 relates to the interaction between the flight module 4 and its environment while in flight and includes pitch, roll and yaw position, velocities and accelerations. The 'flight condition 48' of the flight module 4 also includes the direction, altitude, airspeed, rates of climb, descent or turn, relative wind, environmental conditions such as ambient air temperature and pressure, and any other information that can be detected by a conventional sensor 46 and that may be of use to the control system 26.

Also from FIG. 6, navigation sensors 61 may inform the control system 26. Navigation sensors 61 may comprise terrain and obstacle sensors 63, such as radar, lidar or optical detectors. The terrain and obstacle sensors 63 inform the control system 26 of its surroundings when the flight module 4 is in flight near to the ground.

E. Control System Architecture

Figure 7:
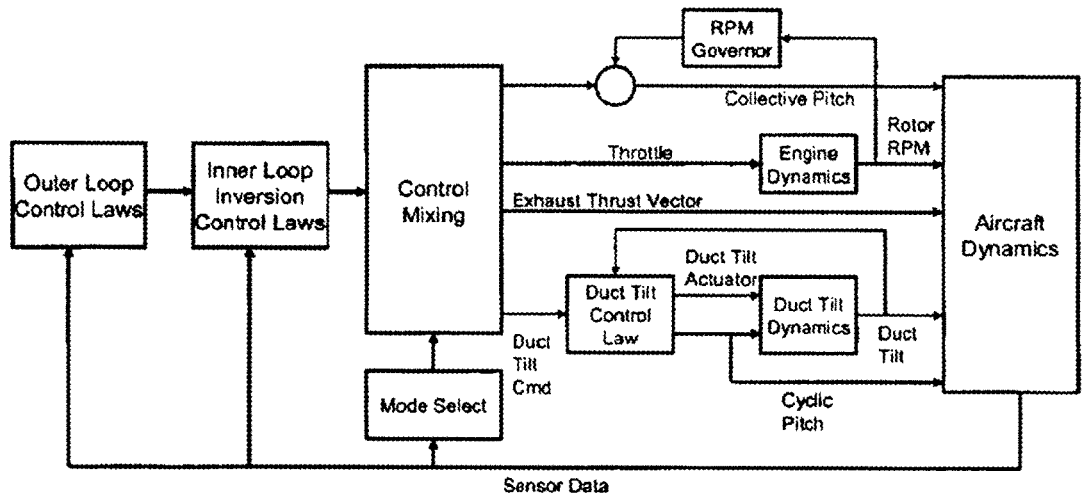
FIG. 7 is a diagram of the control system architecture.
Figure 8:
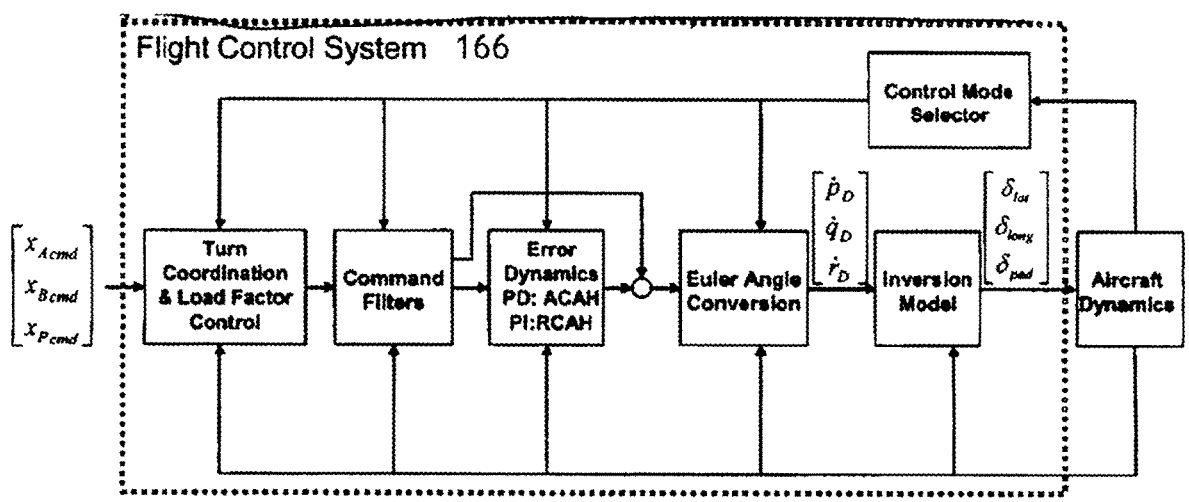
FIG. 8 is a second diagram of the control system architecture.

FIGS. 7 and 8 illustrate operation of the control system 26 as described in the documents incorporated by reference. The control mixer is an open-loop system that determines the actuator commands for all control effectors 28 on the flight module 4 as a static function of the primary flight control inputs and the control mode is determined by airspeed and the current duct tilt. The four primary control inputs to the mixer are the lateral, longitudinal, thrust and yaw controls. The control effectors 28 will be the redundant control effectors 28 described in the documents incorporated by reference or as described above with respect to FIG. 5. Control mixing can sometimes be achieved using a mechanical system, but for a fly-by-wire configuration the mixing can be programmed for implementation by the microprocessor. The latter approach provides greater flexibility and more readily accommodates modifications and upgrades. Control mixing achieves the control modes to control roll, pitch, yaw and thrust in all flight configuration and during transition between configurations. In transition between the low speed tandem rotor configuration, the low speed side-by-side configuration 12, and the high speed tilted-rotor configuration 10, the controls will be blended smoothly between the modes.

The inner loop flight controls use a dynamic inversion scheme since the stability and control characteristics vary significantly in the side-by-side and tilted-rotor configuration 12, 10. The inversion model can be scheduled as a function of the duct tilt, airspeed, and configuration parameters to provide consistent and predictable response characteristics across the flight envelope and configuration space.

In hover in the side-by-side configuration 12, the control system 26 will achieve attitude command/attitude hold (ACAH) response type in roll and pitch, and rate command/ heading (RCHH) response in yaw. In tilted-rotor configuration 10 the pitch and yaw axes will include turn compensation modes, and the roll mode can either be a rate command or attitude command system. The thrust control will be open loop in the core inner loop flight controls.

The RPM governing systems on the flight module 4 are particularly challenging since the RPM must be regulated in both helicopter (side-by-side) and cruise (tilted-rotor) flight modes. Typically blade-pitch governing systems are used on tilt rotor aircraft, as they are more effective in airplane mode where the rotor torque is sensitive to changes in airspeed. The control system 26 included blade-pitch governing. The pilot or control system 26's thrust or collective control is directly tied to the engine throttle. The control mixing determines collective pitch as a sum of the feed forward collective input and a trimming signal from the RPM governor. The feed forward input comes from the pilot or control system 26 thrust input and the differential collective input (tied to roll and yaw axes). The RPM governor trim signal is based on proportional plus integral compensation on the rotor speed error from the nominal.

When the flight module 4 is piloted, either by a supervisory human occupant of the mission module 6 or by a human operator at a remote location, the outer loop control laws will achieve a translation rate command response type in rotary wing flight, where the vehicle lateral and longitudinal speed are proportional to pilot stick input. In the thrust axis, the control will achieve vertical speed command/height hold. Such a control law can allow operation in degraded visual environments or high confined environments with reasonably low pilot workload. Upon the pilot releasing the controls, the system will revert to full autonomous control. In piloted tilted-rotor configuration 10, the outer loop controls will feature airspeed and altitude hold modes that can also be programmed through the displays. The outer loop control laws can be tied to a basic waypoint navigation system.

Unlike a conventional tilt rotor aircraft, symmetric and differential duct tilt of the flight module 4 will be part of the inner loop primary flight control for the pitch, roll and yaw axes. The use of cyclic pitch on the rotors will be used to twist the ducts differentially through a flexible torsion beam and will reduce the actuation requirements for duct tilt during conversion to tilted-rotor configuration 10. A stiff rotor system will be used so significant hub moments can be achieved by cyclic pitch.

F. Example Mission

Figure 9:
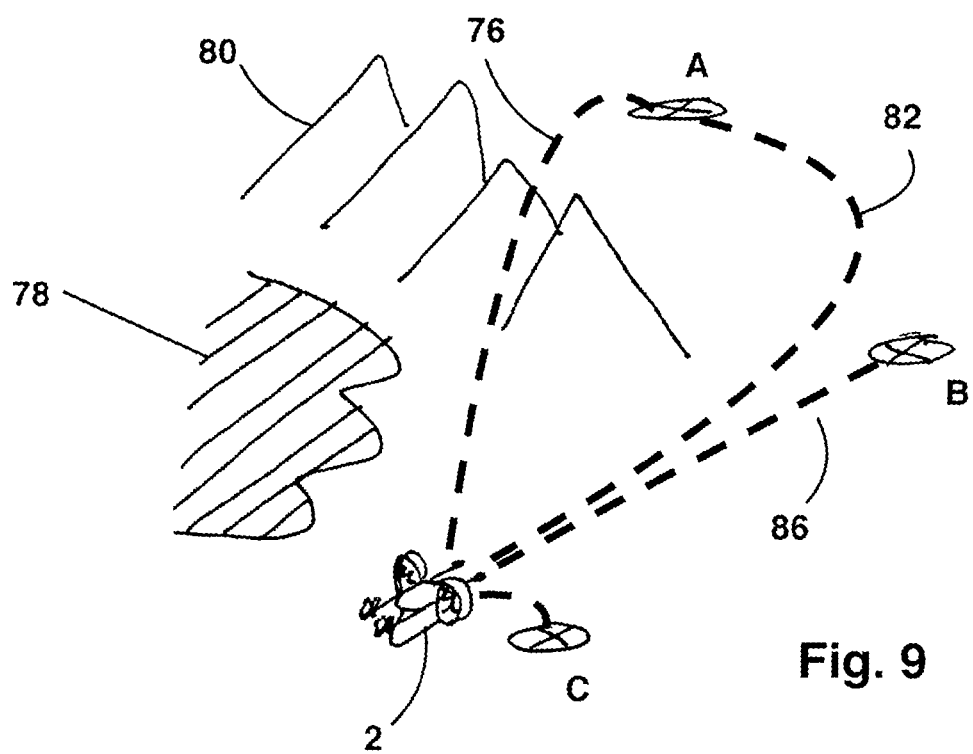
FIG. 9 is a perspective view of an example mission.

FIG. 9 depicts a typical mission of the personal air vehicle 2. FIGS. 10 through 13 are a flow chart illustrating the actions taken by the control system 26 to accomplish that or any other mission. From FIG. 9, the mission of a flight module 4 is to fly to a wounded soldier at location 'A' and to retrieve the wounded soldier in a medical module. There are multiple flight paths that the flight module 4 may take to reach the soldier, illustrated by a first flight path 76 and a second flight path 82. The first flight path 76 is faster and more direct, but passes near an area under hostile control 78 and over elevated terrain 80, and so is more hazardous. A second flight path 82 avoids the elevated terrain 80 and the hostile-controlled area 78, but is slower. FIG. 9 illustrates a known suitable landing location 'B' that the flight module 4 may reach by following a third flight path 86. Location 'C' is an unsuitable landing location that may be used if nothing else if achievable by the flight module 4.

G. Flow Chart of Decisions by the Control System

1. Geographic, Anthropogenic and Weather Information

From the flow chart of FIGS. 10, 11, 12 and 13, in step 88 the control system 26 is configured to receive and consider information from a source other than the sensors 46 in accomplishing a mission. The information may be geographic, anthropomorphic or weather information. The information may be resident in the computer memory 54 of the control system 26 or may be transmitted to the control system 26 over the radio transceiver 50 or by other data link. The geographic, anthropogenic and weather information is accessible by the microprocessor 44 and informs the control system 26 of known limitations. The geographic information includes elevated or uneven terrain 80, areas of open water, areas of tree cover, and any other natural features that may restrict flight or landing, and may identify areas free of those constraints. In FIG. 9 the geographic information includes the location of area of elevated terrain 80. The anthropogenic information may include identification and location of areas under hostile control 78 where flight is hazardous and also may include other human-constructed obstacles such as buildings, communications towers and transmission lines. Anthropogenic features may include resources available to the flight module 4, such as areas under friendly control, known safe landing areas, service areas and medical facilities. In the example of FIG. 9, the anthropogenic features include an area under hostile control 78 and a known suitable landing and service location 'B.' Weather information includes all weather data and predictions that may affect the travel, landing or takeoff of the flight module 4. Where the geographic, anthropogenic and weather information is supplied by radio 50 or other data link, the information may be updated during the mission and the control system 26 may update flight path 76, 86 and flight condition 48 decisions to reflect changes to the geographic, anthropogenic and weather information.

2. Mission Criteria

Figure 10:
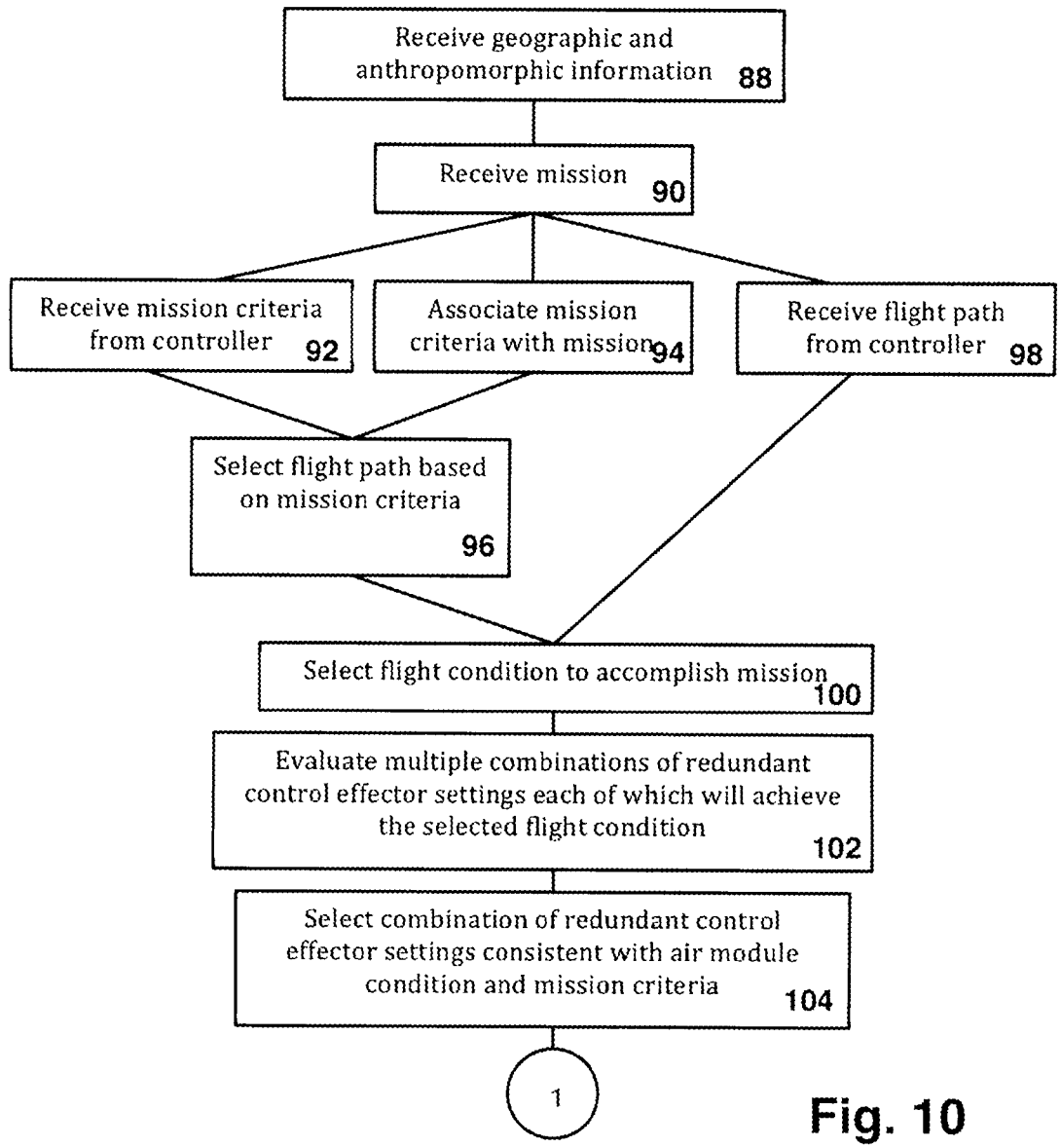
FIGS. 10 through 13 are a flow chart of actions taken by the control system.

From step 90 of FIG. 10, the control system 26 is configured to receive a mission from a controller, which may be received through the radio transceiver 50. The mission in the example of FIG. 9 is to retrieve the wounded soldier at location 'A' and to fly the soldier to a medical facility. Each mission will have associated mission criteria. From step 92, the control system 26 may receive some or all of the mission criteria from the controller over the radio transceiver 50. Alternatively, from step 94 the control system 26 may associate mission criteria resident in computer memory 54 with the mission without external instruction. The mission criteria may include the priority, urgency, hazard tolerance and cost tolerance of the mission. Each of the mission criteria serves as a weighting factor to determine the weight given to each of the mission criteria in making decisions to accomplish the mission.

The mission criterion of priority determines the order in which the control system will undertake a mission in a mission queue of multiple missions. The control system 26 in general will undertake a high priority mission before a low priority mission; however, the control system may consider other criteria in assessing the sequence to accomplish a series of missions in a mission queue. For example, if a flight module 4 delivers a high-priority medical mission module 6 to a location, the control system may conclude that the cost tolerance of the mission criteria for the queue of missions requires that the flight module 4 next pick up a low-priority cargo mission module 6 out of priority order from the same location for the return trip.

The mission criterion of urgency determines the weight given by the control system 26 to quickly accomplishing the mission. Some missions have a high urgency, such as retrieving the wounded soldier from a battlefield, and some a lower urgency, such as the delivery of general supplies.

The mission criterion of hazard tolerance determines the weight given by the control system in reducing danger to the flight module 4 or to its passengers or cargo. When the flight module 4 is transporting passengers, or when there is a shortage of flight modules 4, the hazard tolerance may be low, causing the control system 26 to make decisions that reduce risk.

The mission criterion of cost tolerance determines the weight given by the control system to reducing the cost of accomplishing the mission, which may include both short-term costs such as fuel consumed, and long-term costs, such as life cycle costs of the flight module.

3. Flight Path Selection

Steps 96 and 98 relate to selection of the flight path 76, 82 for the mission. If the control system 26 receives an assigned flight path 76, 82 from the controller, the control system 36 will follow the assigned flight path 76, 82. The control system 26 is configured so that if it does not receive an assigned flight path 76, 82 for a mission, the control system 26 will select the flight path 76, 82.

In selecting the flight path 76, 82, the control system 26 will evaluate a plurality of possible flight paths 76, 82 and will select the flight path 76, 82 that best meets the mission criteria for the assigned mission based on the condition of the flight module 4 and based on the geographic, anthropogenic and weather information. In the example of FIG. 9, the control system 26 may select from a multiplicity of possible flight paths 76, 82. Many flight paths 76, 82 are rejected out of hand as too slow, too dangerous or too costly. The flight control system 26 is configured to select a manageable number of remaining possible flight paths 76, 82 and evaluate each of those flight paths 76, 82 based on the mission criteria. The control system 26 may select the flight path 76, 82 iteratively; that is, by identifying one or more acceptable flight paths 76, 82 in its initial evaluation and then evaluating additional possible flight paths 76, 82 similar to the identified acceptable flight paths 76, 82. The control system 26 may be configured to continue the iterative evaluation process until the control system 26 does not identify significant improvements between evaluated flight paths 76, 82 and to then select the evaluated flight path 76, 82 that is most consistent with the mission criteria.

In the example of FIG. 9, only two candidate flight paths 76, 82 to the wounded soldier are shown for simplicity. The first flight path 76 is more direct, faster, and less costly in terms of fuel consumed. The first flight path 76 also is more hazardous due to terrain and due to the proximity of territory under hostile control 78. The second flight path 82 is longer, slower and more costly in terms of fuel, but is safer due to the avoidance of dangerous terrain and avoidance of areas under hostile control 78. If the mission criteria assign the mission a high urgency and a high hazard tolerance due to the need to rapidly evacuate the wounded soldier, the control system 26 may select the first flight path 76. If the mission criteria assign a high urgency but a low hazard tolerance, for example because of a shortage of flight modules, the control system 26 may select the second flight path 82. If fuel for the flight module 4 is in short supply, the need to conserve fuel may dictate that the cost tolerance is low and so the control system 26 may select the more hazardous first flight path 76.

During the mission, the control system 26 will re-evaluate possible flight paths 76, 82 based on all of the information available to the control system 26. In the example of FIG. 9, the control system 26 may receive updated geographic, anthropogenic and weather information indicating a smaller area under hostile control 78 and reducing the hazard of a flight path 76. As a second example, the control system 26 may receive weather information indicating a head wind on the selected flight path 76, 82, slowing the flight module 4 and making the selected flight path 76, 82 less satisfactory in terms of urgency and cost. If the control system 26 determines that based on the mission criteria a different flight path 76, 82 is superior to the flight path 76, 82 that the flight module 4 is following, the control system 26 may be configured to abandon the originally selected flight path 76, 82 and implement the superior replacement flight path 76, 82.

4. Flight Condition Selection

From step 100, the control system 26 will select a flight condition 48 for each portion of the selected or assigned flight path 76, 82 to accomplish the mission. The flight condition 48 will include direction, air speed, altitude, attitude (including pitch, roll and yaw position, angular velocities and accelerations), rates of climb or descent, configuration (tilted-rotor, side-by-side or any other configuration from the documents incorporated by reference), and may include bounds for flight module 4 operating parameters, such as engine speed, bearing temperature, hydraulic pressure, maximum control effector 28 deflections and any other parameter that may be useful to the control system 26.

5. Control Effector Setting Selection

Each of the control effectors 28 has a control effector setting determining the action of the control effector 28 on the flight module 4. As a part of selecting a flight condition 48, from steps 102 and 104 the control system 26 will select a combination of control effector settings to achieve and maintain the selected flight condition 48. Because redundant control effectors 28 are available to the control system 26, the control system 26 can choose among a multiplicity of combinations of control effector settings to achieve the selected flight condition 48.

To select a combination of control effector settings, the control system 26 will identify possible combinations of control effector settings that are projected to achieve the selected flight condition 48 and will evaluate a manageable number of those possible combinations of control effector settings to determine the consistency of each of the combinations of control effector settings with the mission criteria of urgency, hazard tolerance and cost tolerance. The control system 26 will select the combination of control effector settings that best satisfies the mission criteria.

Figure 11:
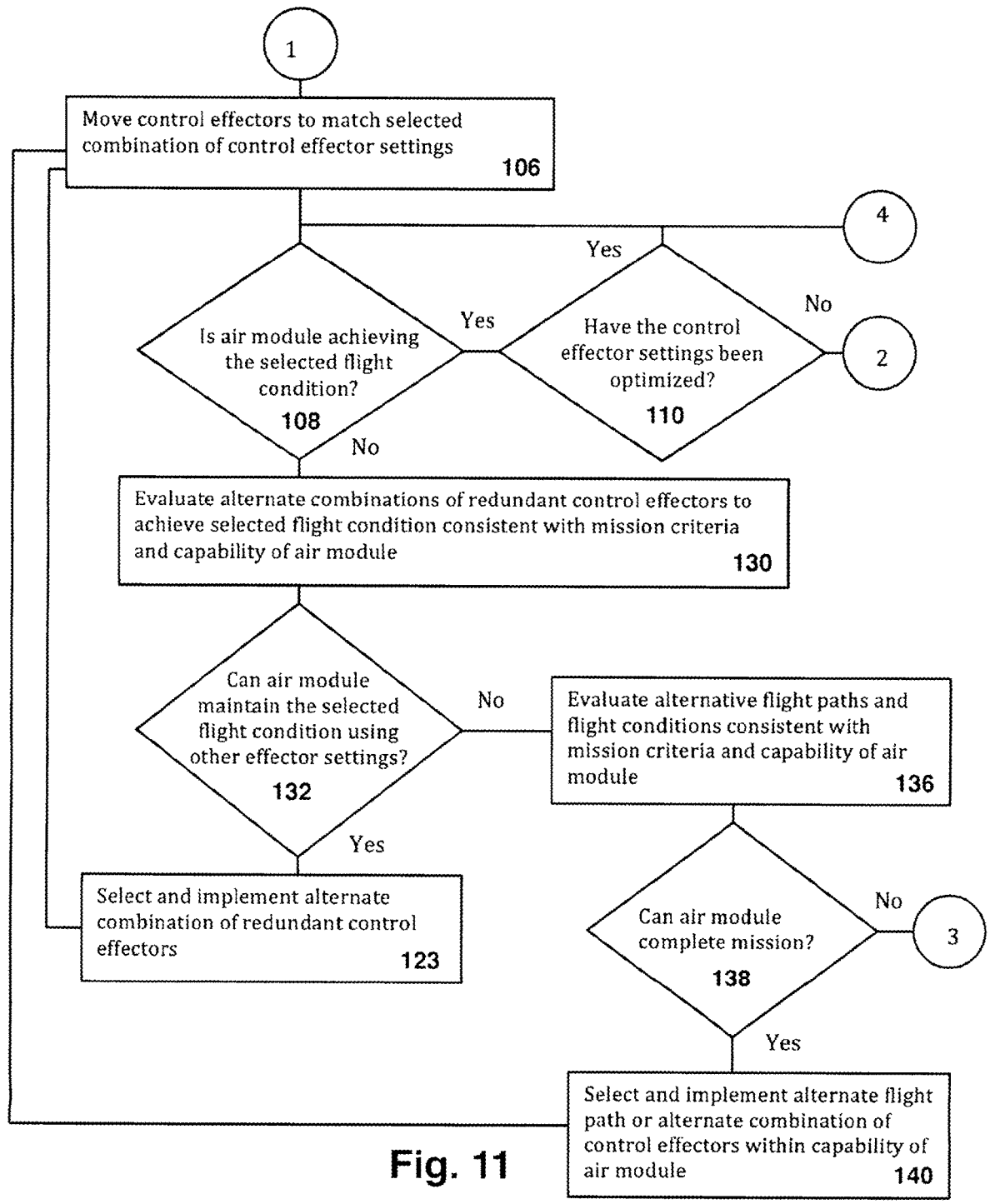

From step 106 on FIG. 11, once the flight path 76, 82, the flight condition 48 and the combination of control effector settings to accomplish the flight condition 48 are selected, the control system 26 will move the control effectors 28 to implement the selected combination of control effector settings, flight condition 48 and flight path 76, 82.

6. Monitoring Compliance with the Selected Flight Condition

From step 108, the control system 26 will monitor whether the flight module 4 is achieving the selected flight condition 48 as detected by sensors 46. If the control system 26 is achieving the selected flight condition 48 with the selected combination of control effector settings, the control system 26 may optimize the control effector settings, illustrated by step 110, to achieve the selected flight condition 48, as indicated by connectors 2 and 4 and by FIG. 12, steps 112 through 128.

7. Optimizing Control Effector Settings

Figure 12:
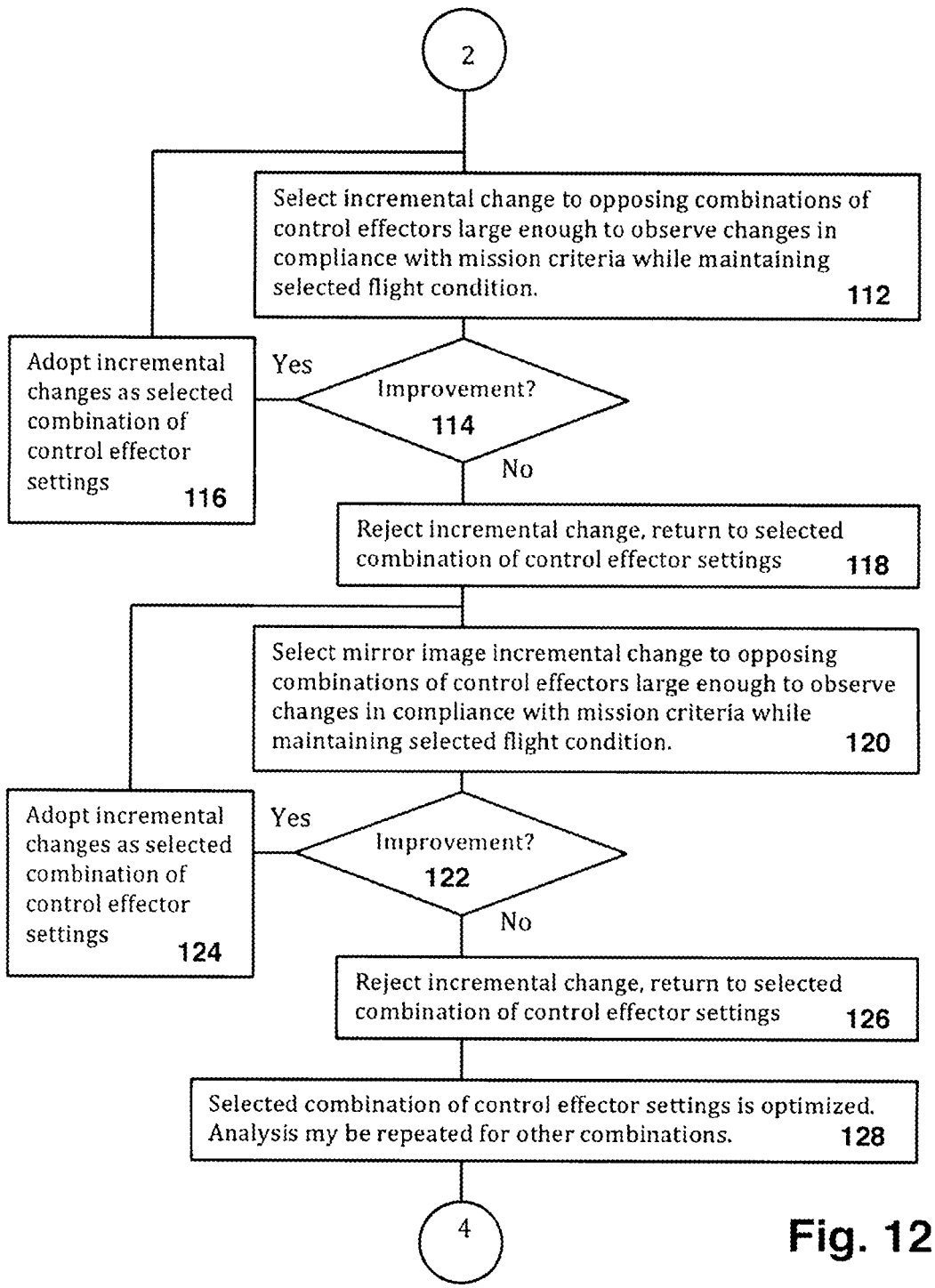

From FIG. 12 step 112, the control system 26 will iteratively select incremental changes to either single control effectors 28 or opposing combinations of control effectors 28 and will move the control effectors 28 to reflect those incremental changes while maintaining the selected flight condition 48. In step 112, the flight module 4 starts in a first condition reflecting the selected combination of control effector settings. The control system 26 will move the single control effector 28 or opposing combination of control effectors 28 until the control system 26 observes that the flight module 4 is in a second condition; namely, when the control system observes a change in meeting the mission criteria that is significant, such as a change in speed, change in fuel consumption, change in vibration frequency or amplitude, or any other change in flight module 4 operation that affects compliance with the mission criteria. If the control system 26 determines that the second condition is an improvement over the first condition from step 114, then the control system 26 will adopt the second condition and the incremental change in step 116 as the selected combination of control effector settings and will repeat the process until the incremental changes to control effector settings do not result in improvements that are significant.

If the control system 26 determines that the second condition is inferior to the first condition; namely, that the incrementally changed control effector settings result in a degradation of compliance with mission criteria, from step 118 the control system 26 will reject the incremental change and will try incremental changes that are opposite to those tried previously, referred to in step 120 of FIG. 12 as 'mirror image' incremental changes. If the observed changes in mission criteria compliance are an improvement, the control system 26 is configured to adopt the incremental changes as the selected control effector settings in step 124 and to repeat the process until the control system 26 detects no further improvements in compliance with the mission criteria that are significant. If the control system 26 detects a degradation of compliance with mission criteria, from step 126 the control system 26 rejects the incremental change, returns to the last selected combination of control effector settings, and concludes that the combination of control effector settings is optimized in step 128. The control system 26 may investigate other combinations of control effector settings in a similar manner.

Throughout the step of optimizing the control effector settings, the control system 26 monitors the condition of the flight module 4 and whether the flight module 4 is meeting the selected flight condition 48, as indicated by connector 4 and step 108 of FIG. 11.

8. Adapting to Damage to the Flight Module

While the control system 26 is monitoring the flight module 4, as shown by step 108 of FIG. 11, the control system 26, informed by sensors 46, may detect that the flight module 4 is not achieving the selected flight condition 48. The reason for failure may be relatively innocuous, for example a gust of wind; however, the failure may be due to significant failures that jeopardize the mission, for example battle damage or the failure of a key flight module system.

Regardless of the reason for failure to meet the selected flight condition 48, the approach of the control system 26 will be the same. First, the control system 26 will attempt to return to the selected flight condition 48 using the redundant control effectors 28, as shown by steps 130 and 132 of FIG. 11. The control system 26 will select alternative combinations of control effector settings to return the flight module 4 to the selected flight condition 48 and will evaluate whether the flight module 4 will be able to return to the selected flight condition using the alternative combinations of control effector settings. If the control system 26 projects that the flight module 4 will be able to return to the selected flight condition 48, the control system will select one of the combinations of control effector settings and will move the control effectors 28 to those settings, as indicated by steps 134 and 106 of FIG. 11. The control system in step 108 will monitor whether the change in control effector settings was successful in returning the flight module 4 to the selected flight condition 48. Control effector position sensors 46 will inform the flight module 4 as to whether the control effectors 28 moved and by how much in response to the command. The control system 26 also will detect whether the flight module 4 is responding as expected to the changes to control effector settings. From these data, the control system 26 may infer whether some or all of the control effectors 28 are operating and available.

If in step 130 the control system 26 determines that flight module 4 is capable of controlled flight but the flight module 4 does not respond as expected to a selected combination of control effector settings or if a sensor 46 detects an anomaly with respect to a control effector 28, the control system 26 may interrogate the suspect control effector 28 by commanding a change in control effector 28 position and observing the response of the flight module 4. Alternatively, the control system 26 may infer the response of the flight module 4 to changes to a control effector 28 position from the response of the flight module 4 to changes in a combination of control effectors 28 of which the suspect control effector 28 is a part. The control system 26 may infer the performance of the control effector 28 and may assign a new model to the control effector 28 for the purposes of the model-following nature of the control system architecture to reflect the observed or inferred change in performance of the control effector 28.

If the control system 26 determines in step 108 that the flight module 4 successfully achieves the replacement flight condition, the control system 26 is configured to optimize the replacement control effector settings, as shown by FIG. 12, steps 112-128, and to monitor whether the flight module 4 is meeting the selected replacement flight condition 48 using the replacement control effector settings, in step 108 and 110.

If a first alternative combination of control effector settings does not return the flight module 4 to the selected flight condition 48, the control system 26 may repeat steps 130 through 134 to select another alternative combination of control effectors 28, which may be all of the redundant control effectors 28 applicable to the selected flight condition 48.

From steps 136, 138 and 140 of FIG. 11, the control system 26 is configured so that if the control system 26 concludes that the flight module 4 cannot maintain the selected flight path 76, 82 or flight condition 48 consistent with the mission criteria, the control system 26 will evaluate alternative flight paths 76, 82 and alternate flight conditions 48 that may meet the mission criteria to accomplish the mission. If the control system 26 concludes that the flight module 4 can complete the mission using an alternative flight path 76, 82 or flight condition 48 and consistent with the mission criteria, then the control system 26 will select a replacement combination of control effector settings to implement the replacement flight path 76, 82 and flight condition 48 and will move the control effectors 28 to match the replacement selected settings of the control effectors 28. The control system 26 then will optimize the replacement selected control effector settings as shown by FIG. 11 step 110 and FIG. 12 steps 112-128 and will monitor whether the flight module 4 is achieving the replacement selected flight condition 48 as indicated by FIG. 11, step 108.

Figure 13:
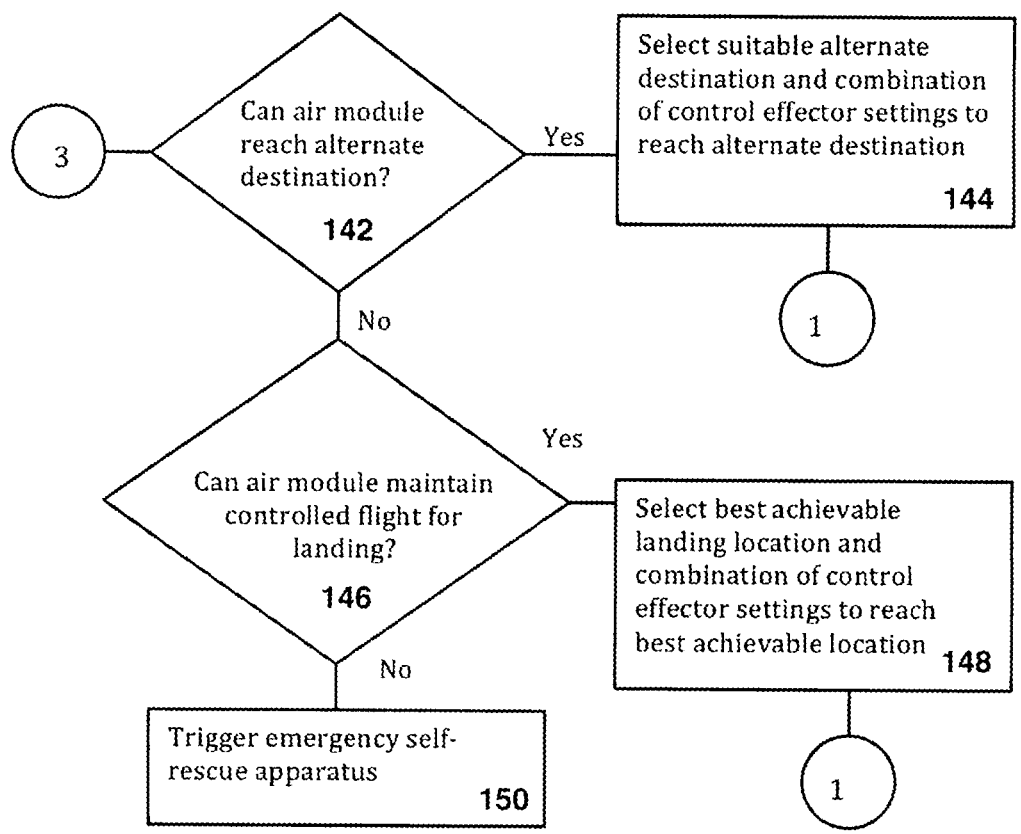

From step 138 and 142 through 150 of FIGS. 11 and 13, if the control system 26 concludes that the flight module 4 cannot complete the mission consistent with the mission criteria, the control system 26 will cause the flight module 4 to take an alternative action. 'Alternative action' may include landing at a suitable landing location such as location 'B' of FIG. 9, landing at a best achievable landing location such as location 'C' of FIG. 9, and emergency rescue measures. The control system 26 will project whether the personal air vehicle 2 will be able to reach a suitable landing location (location 'B' of FIG. 9), such as a known safe landing and service area. If so, from step 144 of FIG. 13 the control system 26 will select a flight path 86 and flight condition 48 to reach the suitable landing location 'B' and will select a combination of control effector settings to achieve the flight condition 48 consistent with the remaining capability of the flight module 4. The control system 26 will move each of the control effectors 28 to correspond to the selected combination of control effector settings, from step 106 of FIG. 11 and will monitor (step 108) and optimize (steps 110-128) the performance of the flight module 4 as it travels to the suitable landing location 'B'.

If from step 142 the control system 26 projects that the flight module 4 will not be able to reach a suitable landing location 'B', from step 146 the flight module 4 will project whether the flight module 4 can maintain controlled flight long enough to achieve a controlled landing at any location. If so, from step 148 the control system 26 will identify the best achievable landing location (location 'C' on FIG. 9), consistent with the remaining capability of the flight module. The control system 26 will identify the best achievable landing location 'C' through the geographic, anthropogenic and weather information received by the control system 26 and also as informed by terrain and obstacle sensors 63 on the flight module 4. The control system 26 will select a combination of control effector settings consistent with the remaining capability of the flight module 4 to travel to and land at the selected best achievable landing location 'C' and will move the control effectors 28 to the selected settings, as indicated by connector '1' and step 106 of FIG. 11. From steps 108 and 110-128, the control system will monitor and optimize the performance of the flight module 4 while the flight module 4 is in flight to the best achievable landing location 'C.'

From step 150 of FIG. 13, if the control system 26 determines that the flight module 4 cannot maintain controlled flight to achieve a controlled landing, the control system 26 may be configured to trigger emergency self-rescue measures 75. The self rescue measures 75 may be any of the self-rescue apparatus taught by the documents incorporated by reference and may include one or more ballistic parachutes to slow the descent of the flight module 4 and air bags to cushion its landing.

LIST OF NUMBERED ELEMENT

The following are the numbered elements from the specification and drawings.
personal air vehicle 2
flight module 4
mission module 6
two ducted fans 8
tilted-rotor configuration 10
side-by-side configuration 12
central unit 14
engines 16
drive system 18
avionics 20
wing extensions 22
landing gear 24
control system 26
control effectors 28
axis of rotation of a ducted fan 30
leading edge portion 32
duct 34
air dam 36
trailing edge control surface 38
landing gear 40
landing gear control surfaces 42
control system microprocessor 44
plurality of sensors 46
flight condition 48
radio transceiver 50
port 52
computer memory 54
condition of the flight module 56
control effector position sensors 57
cyclic pitch control effector 58
flight module systems condition sensors 59
collective pitch control effector 60
navigation sensors 61
throttle position 62
terrain and obstacle sensors 63
rotor tilt 64
active CG control 66
engine exhaust vectoring 68
ducted fan exhaust vane 70
wing extension control surface 72
supplemental fans 73
self-rescue effectors 75
first flight path 76
hostile area 78
elevated terrain 80
second flight path 82
third flight path 86
mission destination 'A'
suitable landing location 'B'
best achievable landing location 'C'

I claim:

1. A control system for a rotary wing aircraft, the control system comprising:
   a. a control system microprocessor, said microprocessor being configured to receive mission criteria, said microprocessor being configured to select a flight condition of the aircraft consistent with said mission criteria, the selected flight condition consisting of one or more of an attitude, an air temperature, an air pressure, a relative wind, an air speed, an acceleration, a rate of climb, a rate of descent, a rate of turn, a position in pitch, an angular velocity in pitch, an angular acceleration in pitch, a position in roll, an angular velocity in roll, an angular acceleration in roll, a position in yaw, an angular velocity in yaw, and an angular acceleration in yaw;
   b. a plurality of control effectors, each of the control effectors being configured to provide to the aircraft a control force or a control moment that is redundant to the control force or the control moment applied by another control effector, each of the control effectors having an effector setting, said control system microprocessor being operably attached to each of said control effectors, said control system microprocessor being configured to select a selected combination of control effector settings from among a plurality of combinations of control effector settings, each of said plurality of combinations of control effector settings being projected by said control system to achieve said selected flight condition, said control system being configured to move said plurality of control effectors to said selected combination of control effector settings;

c. a plurality of sensors, said plurality of sensors being operably attached to said microprocessor, said plurality of sensors being configured to detect a condition of the aircraft, said control system as informed by said sensors being configured to detect said selected flight condition wherein when said control system microprocessor, informed by said sensors, determines that the aircraft is achieving said selected flight condition, then said control system microprocessor is configured to select a replacement combination of control effector settings from among a plurality of replacement combinations of control effector settings during said mission, each of said plurality of replacement combinations of control effector settings being projected to achieve said selected flight condition, said replacement combination of control effector settings being incrementally different from said selected combination of control effector settings, said control system microprocessor being further configured to move said plurality of control effectors to correspond to said replacement combination of control effector settings.

2. The control system of claim 1 wherein said control system microprocessor is configured to compare a first condition of said aircraft as detected by said sensors when said aircraft is flying using said selected combination of control effector settings to a second condition of said aircraft when said aircraft is flying with said replacement combination of control effector settings, said control system microprocessor being configured to determine which of said first and second conditions meets said mission criteria, said control system microprocessor being configured to select and to implement said combination of control effector settings corresponding to which of said first and second conditions that meets said mission criteria, said combination of control effector settings corresponding to which of said first and second conditions meets said mission criteria becoming said selected combination of control effector settings, said condition of said aircraft when said control system implements said combination of control effector settings corresponding to which of said first and second conditions meets said mission criteria becoming said first condition.

3. The control system of claim 2 wherein the control system microprocessor is configured to iteratively select said replacement combination of control effector settings from said plurality of combinations of control effector settings projected to achieve said selected condition, to compare said first condition to said second condition, to determine which of said first and second conditions meets said mission criteria, to select as said selected combination of control effector settings said combination of control effector settings corresponding to which of said first and second conditions that meets said mission criteria, and to implement said selected combination of control effector settings.

4. A control system for a rotary wing aircraft, the control system comprising:

a. a control system microprocessor, said control system microprocessor being configured to receive mission criteria, said control system microprocessor being configured to select a flight condition of the aircraft consistent with said mission criteria, the selected flight condition consisting of one or more of an attitude, an air temperature, an air pressure, a relative wind, an air speed, an acceleration, a rate of climb, a rate of descent, a rate of turn, a position in pitch, an angular velocity in pitch, an angular acceleration in pitch, a position in roll, an angular velocity in roll, an angular acceleration in roll, a position in yaw, an angular velocity in yaw, and an angular acceleration in yaw;

b. a plurality of control effectors, each of the control effectors being configured to provide to the aircraft a control force or a control moment that is redundant to the control force or the control moment applied by another control effector, each of the control effectors having an effector setting, said control system microprocessor being operably attached to each of said control effectors, said control system microprocessor being configured to select a selected combination of control effector settings from among a plurality of combinations of control effector settings, each of said plurality of combinations of control effector settings being projected by said control system to achieve said selected flight condition, said control system being configured to move said plurality of control effectors to said selected combination of control effector settings;

c. a plurality of sensors, said plurality of sensors being operably attached to said control system microprocessor, said plurality of sensors being configured to detect a condition of the aircraft, said control system as informed by said sensors being configured to detect said selected flight condition wherein said control system microprocessor is configured to interrogate a one of said plurality of control effectors by perturbing said control effector, by observing said condition of said aircraft, and by determining whether said condition of said aircraft after said perturbation is consistent with an expected condition of said aircraft after said perturbation.

5. The control system of claim 4 wherein said control system microprocessor selects said selected combination of said control effectors based on a model of a performance of each said control effector, said control system microprocessor is configured to detect a change in said performance of said control effector based on a change in said flight condition of said aircraft in response to said perturbation of said control effector, said control system microprocessor being configured to change said model of said performance of said control effector based on said change in said flight condition of said aircraft in response to said perturbation of said control effector.

6. A control system for an aircraft, the control system comprising:

a. a control system microprocessor, said control system microprocessor being configured to select a flight condition of the aircraft, the selected flight condition consisting of one or more of an attitude, an air temperature, an air pressure, a relative wind, an air speed, an acceleration, a rate of climb, a rate of descent, a rate of turn, a position in pitch, an angular velocity in pitch, an angular acceleration in pitch, a position in roll, an angular velocity in roll, an angular acceleration in roll, a position in yaw, an angular velocity in yaw, and an angular acceleration in yaw;

b. a plurality of control effectors, each of the control effectors being configured to provide to the aircraft a control force or a control moment that is redundant to the control force or the control moment applied by another control effector, each of the control effectors having an effector setting, said control system microprocessor being operably attached to each of said control effectors, said control system microprocessor being configured to select a selected combination of control effector settings from among a plurality of combinations of control effector settings, each of said plurality of combinations of control effector settings being projected by said control system to achieve said selected flight condition, said control system being configured to select said selected combination of said control effectors based on a model of a performance of each said control effector, said control system being configured to move said plurality of control effectors to said selected combination of control effector settings;

c. a plurality of sensors, said plurality of sensors being operably attached to said control system microprocessor, said plurality of sensors being configured to detect a condition of the aircraft, said control system as informed by said sensors being configured to detect said selected flight condition, said control system is configured to interrogate a one of said plurality of control effectors by perturbing said control effector, by observing said condition of said aircraft, and to determine whether said condition of said aircraft after said perturbation is consistent with an expected condition of said aircraft after said perturbation, said control system is configured to detect a change in said performance of said control effector based on a change in said flight condition of said aircraft in response to said perturbation of said control effector, said control system being configured to change said model of said performance of said control effector based on said change in said flight condition of said aircraft in response to said perturbation of said control effector.

\* \* \* \* \*